2 Sheets—Sheet 2.
J. G. CRANSTON.
Rock-Drill.
No. 223,888.   Patented Jan. 27, 1880.
FIG. 3.
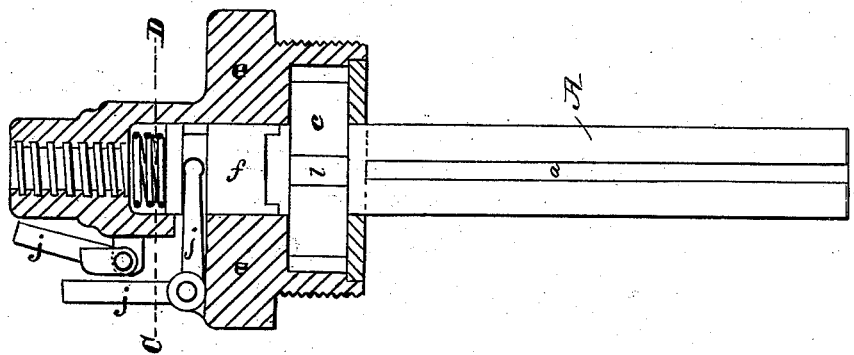
FIG. 4.
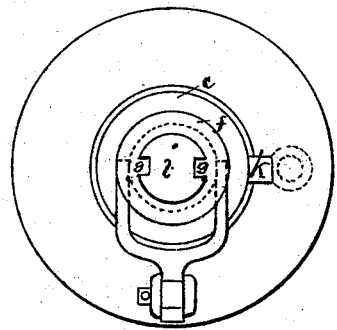
FIG. 5.
WITNESSES
Frank A. Brooks
INVENTOR
John G. Cranston
By Dewey & Co.
Attys

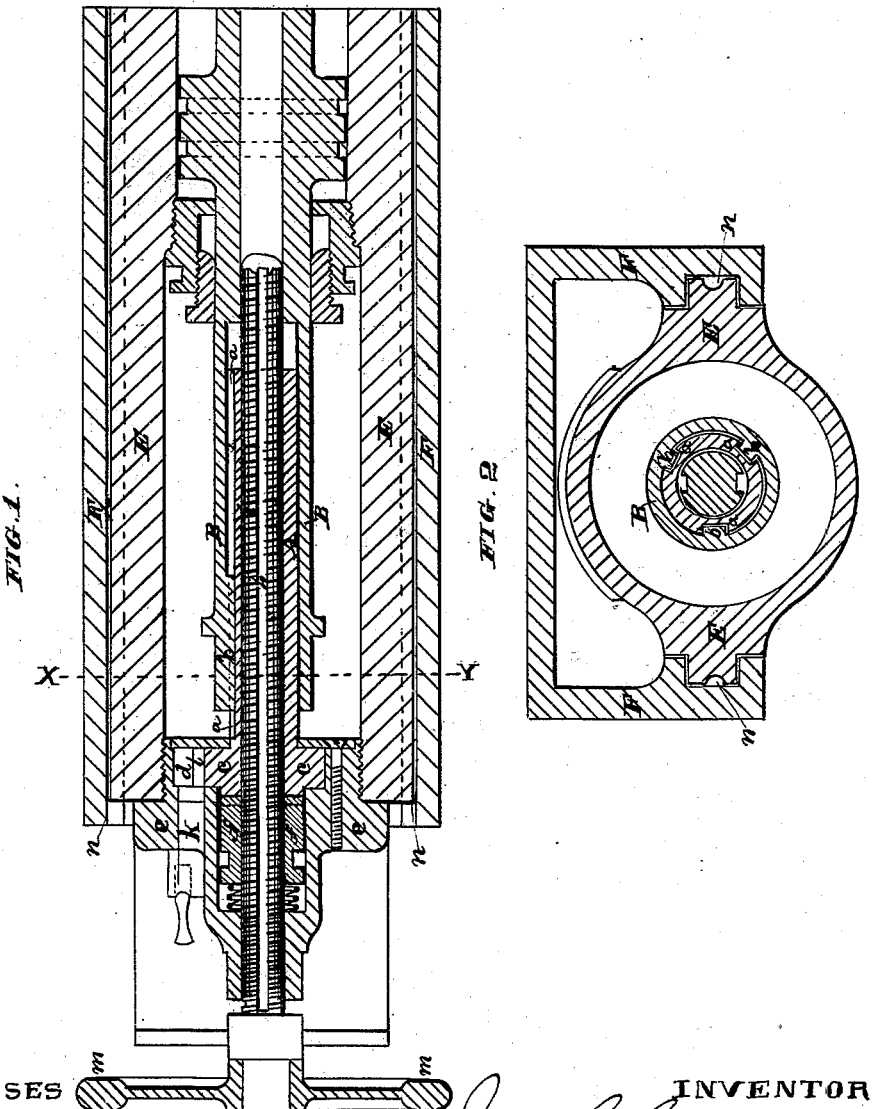
J. G. CRANSTON.
Rock-Drill.
No. 223,888.  Patented Jan. 27, 1880.

UNITED STATES PATENT OFFICE.

JOHN GREY CRANSTON, OF NEWCASTLE-UPON-TYNE, ENGLAND.

ROCK-DRILL.

SPECIFICATION forming part of Letters Patent No. 223,888, dated January 27, 1880.

Application filed August 19, 1879.

*To all whom it may concern:*

Be it known that I, JOHN G. CRANSTON, of Newcastle-upon-Tyne, England, have invented an Improved Rock-Drill; and I hereby declare the following to be a full, clear, and exact description thereof.

My invention relates to certain improvements in such machines as drill or cut rock by the reciprocating action of the drilling or cutting tool attached to the piston-rod of a piston moved by steam or compressed air; and my improvements refer more particularly to the parts of such machines by which the drilling or cutting tool is rotated on its axis or is prevented from rotating, as is more fully described and claimed, and shown in the accompanying drawings, in which—

Figure 1 is a horizontal section. Fig. 2 is a vertical cross-section through the line $x\,y$ of Fig. 1. Fig. 3 is partly in plane and partly in horizontal section. Fig. 4 is a vertical cross-section through the line C D of Fig. 3; and Fig. 5 is a plan of the rotating tube with the cover removed.

The tube A is fitted with one or more parallel grooves, $a$, cut in the sides of said tube, as shown. The upper end of the piston-rod B is bored out to receive this tube A, the opening in the piston-rod having projections or flanges $b$, which fit into and slide along the grooves $a$, for the purpose hereinafter described.

The top end of the tube A is held by a collar, $c$, moving freely in the box $d$, which is formed in the cover $e$. The top of the collar of the tube is recessed to receive the projections on the bottom of the clutch $f$. The clutch $f$ is also fitted with projections $g$, which slide in the parallel grooves $h$ of the feed-screw $i$, the clutch $f$ turning around freely on its axis when the feed-screw is turned.

The operation of the device is as follows: The rotary motion of the drilling-tool is produced on turning the lever $m$ of the feed-screw when the clutch $f$ is in gear. The piston-rod with its attached tool is thus caused to rotate on its axis by means of the grooves in the feed-screw and tube acting upon the projections on the clutch and piston-rod. The position of the grooves and projections may be reversed—that is, the tube may be fitted with projections and the grooves be formed in the inside of the piston-rod—when the same results will be obtained.

If it is desired to prevent the tool from rotating, and to produce a slotting or cutting motion, the clutch $f$ is thrown out of gear by means of levers $j\,j'$ and the pin $k$ is inserted in the slot $l$ in the collar $c$, which prevents the tube from turning on its axis, and consequently prevents the piston and cutting-tool from rotating.

In this device the drilling or cutting tool can be rotated to any degree with certainty at any part of the stroke of the piston-rod. The cutting or drilling tool can also be readily and with certainty prevented from rotating, thus producing a slotting motion when desired. The mechanism by which the rotary motion is produced is not liable to a derangement, as it is independent both of the motion of the piston-rod and the blow produced thereby.

The piston, tube, &c., move in the sliding carriage E, which moves in grooves $n$, formed in the casing F, as shown, and the whole—tube, piston, and carriage—is moved forward by means of the feed-screw.

Having thus described my invention, what I claim as new, and desire to secure by Letters Patent, is—

In combination with the grooved tube A, fitting in the flanged hollowed piston-rod B, the recessed collar $c$, moving in the box $d$, and the clutch $f$, with its projections $g$ and levers $j\,j'$, said clutch moving on the feed-screw $i$, and pin $k$, fitting into slot $l$, substantially as and for the purpose herein described.

In witness whereof I have hereunto set my hand.

JOHN GREY CRANSTON.

Witnesses:
JOSEPH W. SWAN,
   *Chemist, Mosley Street, Newcastle.*
REES ROWLAND JONES,
   6 *Grey Street, Newcastle.*
I. C. FENWICK,
   *A Commissioner, &c.*